Patented Mar. 15, 1932

1,849,503

UNITED STATES PATENT OFFICE

HENRY DAVID MOMMAERTS, OF AMSTERDAM, NETHERLANDS, ASSIGNOR TO N. V. NORIT-VEREENIGING VERKOOP CENTRALE, OF AMSTERDAM, NETHERLANDS

PROCESS FOR THE MANUFACTURE OF HIGHLY ACTUATED ADSORPTIVE CARBONS

No Drawing. Application filed April 15, 1929, Serial No. 355,429, and in Germany April 16, 1928.

The invention relates to a process for increasing the adsorption capacity of active carbons in granular form and has to its object to obtain highly active carbons having a universally developed adsorptive power. It is known in practice that existing active carbon grades have an adsorptive capacity which is only onesidedly developed, showing a large selectivity so that such active carbons possess good properties for the treatment of specific substances, whereas with respect to other adsorption purposes they are not, or are only slightly, suitable. In this respect there is a difference between active carbons produced by steam or similar mildly oxidizing gases and carbons manufactured with the air of chemicals, such as zinc chloride, phosphoric acid, carbonate of potassium, carbonate of soda, etc.

With the known processes of manufacturing adsorptive carbons it is not possible to produce at will carbons of predetermined properties. By varying the conditions of working the grade of activity of the carbons may be influenced within certain limits, i. e., the carbon can be activated more or less strongly, but in every case in the practice of a given manufacturing process the general character of the adsorptive curve cannot be sensibly varied.

Another disadvantage of the known processes consists in the fact that it is generally difficult to produce highly activated carbons of sufficient hardness and mechanical strength. Generally the activated carbon grows softer if the activation is pushed further. Relatively hard carbons can be produced by starting from hard and dense raw materials such as e. g. cocoanut or other fruit shells or kernels, very hard kinds of woods or the like, which are activated by the action of steam. By this process however the capillary structure of the raw material cannot be modified at will so that the carbons obtained are only suitable for certain uses. Thus cocoanut carbon activated by steam presents a very high retentivity and is therefore well adapted for gas mask carbon, but is of much less value for the technical recuperation of gases and vapours.

The present invention relates to the manufacture of highly activated adsorptive granular carbons, with a capillary structure which can be made adapted in every case to the special industrial application of the carbon.

The process according to the invention consists essentially in impregnating granular steam activated carbon of sufficient hardness with chemical activating agents and subsequently subjecting the carbon to a burning process. The activating agents are caused to act upon the carbon granules at burning temperature. This temperature may range from 450° to 900° C. depending on the activating chemical or chemicals used.

In the practical execution of the invention I may start from any steam activated granular carbon, e. g. made from cocoanut or other fruit shells or kernels, hard kinds of woods, peat, brown coal, anthracite, etc., or their products of carbonization or artificially molded and formed granules of carbonaceous material; or from carbon agglomerates produced from pulverulent charcoal or other carbonaceous materials made by the aid of binding and eventually hardening agents and application of pressure.

As carbon oxidizing chemicals for the impregnation I have obtained good results with all such chemicals, such as phosphoric acid and phosphates, nitric acid and nitrates, sulphuric acids and sulphates, hydrochloric acid and chlorides, carbonates, hydroxides, sulphides, etc., salts of ammonium or of the alkalines, earth alkaline or heavy metals and among these latter e. g. iron, zinc, or aluminium salts, which have been proposed for the production of active carbon from ordinary vegetable material, such as saw dust, peat, brown coal, wood pieces, or their carbonization products.

The above chemicals are only mentioned by way of example, as the invention is not limited to the use of these chemicals, but every agent acting upon the charcoal in the manner described or reacting therewith can be used according to the invention.

It is already well known to activate carbon or carbonizable materials either by steam or other gases or by chemical agents. But according to the present invention the steam-activated carbon is subsequently treated with chemicals and burned in the presence of same, which results in an increase of the activity, while the hardness of the granular carbon is not affected and in some cases is even improved.

If required I can also carry out my process by first activating the vegetable or carbonaceous material by steam or other vapor or gas and then in a following operation impregnating and burning the granules with chemicals.

The process according to the invention can be used on agglomerated charcoals. Agglomerates of charcoal can be prepared in the known manner by starting from a finely divided charcoal or from a precarbonized material which is agglomerated with an admixture of organic or inorganic binding agents or mixtures of both.

On burning these agglomerates, according to the pressures applied and to the nature of the binding agent, hard agglomerates can be obtained which however are in general inactive or nearly inactive. These agglomerates are activated by steam or other gases to a certain degree.

According to the invention agglomerates of this kind, after a pre-activation by steam or other gases as far as compatible with the maintenance of their hardness, are impregnated with chemicals as described above and the thus impregnated agglomerates are heated to redness. In this way highly activated agglomerates are obtained with an adsorptive capacity must in excess of the known agglomerated carbons.

It is specially advantageous, that the subsequent treatment of the carbon according to the invention yields a much higher adsorptive capacity than by the exclusive application of one of the hitherto known processes, as even if the increase of hardness is neglected the losses of carbon are smaller. Thus the new process is very economical.

The combination of gas activation with the chemical activation according to the invention can also be carried out in such manner that the agglomerates are prepared with a preactivated pulverulent carbon. This carbon is then pressed to hard agglomerates which do not decrease in hardness by the subsequent treatment.

It has also been found that the process according to the invention not only permits me to improve the gas adsorptive properties of the granular carbons, but also their decolorizing power and other adsorptive capacity with respect to the adsorption of substances from liquids. Thus the present process is also of importance for the production or improvement of decolorizing and analogous carbons.

After the burning operation the activated carbon can be extracted and washed out in the known manner if desired. Also the above described impregnation according to the invention can be preceded by an extraction or washing, which preliminary treatment is carried out in principle independently of the process according to the invention. In many cases the effect of the treatment according to the invention will be more favorable if applied to an already extracted carbon than on a non-extracted one.

It has been found that by treatment with volatile acids, such as hydrochloric or nitric acid, the carbon becomes acid free during the burning, so that a further washing out of these reagents can be dispensed with. If other reagents are used which are not expelled at the burning, it may be useful to extract same from the activated carbon.

If impregnating according to the invention we can in general suffice with much less chemicals than in the known chemical activation processes, since in the present case the chemicals have only to act upon already formed charcoal. This action can be more or less intensive and e. g. it can be restricted to the removal of the soiling carbonaceous compounds and ash constitutents from the active carbon surface, while in other cases for the sake of enlarging the capillaries it may be desired to burn away part of the carbon from the interior of the granules. Thus according to the uses of the carbon aimed at, the chemicals and other conditions of working can be selected so that the carbon is more or less strongly attacked, e. g. a slight oxidation or analogous action is preferred for the production of carbons of the retentive type.

I claim:

1. The process in which a granular or otherwise fragmentary carbon, agglomerated by means of a binding agent, is activated with steam or other mildly oxidizing gas, impregnated with carbon-oxidizing chemicals and burned.

2. The process in which a granular or otherwise fragmentary carbon agglomerated under high pressure by means of a binding agent, is activated with steam or other mildly oxidizing gas, impregnated with carbon-oxidizing chemicals and thereupon burned.

In testimony whereof I affix my signature.

HENRY DAVID MOMMAERTS.